United States Patent
Clugston et al.

(10) Patent No.: US 7,252,400 B2
(45) Date of Patent: Aug. 7, 2007

(54) ILLUMINATED INDICATOR

(75) Inventors: Mark J. Clugston, Davison, MI (US);
David L. Brooks, Flint, MI (US);
Kenneth D. Perry, New Lothrop, MI (US); Randall J. Heidtman, Columbiaville, MI (US); Gail M. Sylvester, Frankenmuth, MI (US);
Douglas A. Best, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 75 days.

(21) Appl. No.: 10/965,990

(22) Filed: Oct. 15, 2004

(65) Prior Publication Data
US 2005/0128733 A1 Jun. 16, 2005

Related U.S. Application Data

(60) Provisional application No. 60/516,933, filed on Nov. 3, 2003.

(51) Int. Cl.
*G01D 11/28* (2006.01)

(52) U.S. Cl. .................. 362/26; 362/23; 362/27; 362/231; 362/555

(58) Field of Classification Search .......... 362/23, 362/26, 27, 231, 555
See application file for complete search history.

(56) References Cited

U.S. PATENT DOCUMENTS

| | | | |
|---|---|---|---|
| 6,499,852 B1* | 12/2002 | Kino et al. | 362/23 |
| 6,508,563 B2* | 1/2003 | Parker et al. | 362/29 |
| 2002/0135994 A1* | 9/2002 | Ikarashi et al. | 362/23 |

\* cited by examiner

*Primary Examiner*—Stephen F. Husar
*Assistant Examiner*—Meghan K. Dunwiddie
(74) *Attorney, Agent, or Firm*—Jimmy L. Funke

(57) ABSTRACT

An illuminated indicator is disclosed. The illuminated indicator includes graphics disposed on a rear surface of a lightpipe and a housing that supports the rear surface of lightpipe. The housing defines an outer perimeter light channel. The illuminated indicator also includes a plurality of light sources that are disposed about the outer perimeter light channel. The outer perimeter light channel directs light from the plurality of light sources to an outer perimeter edge of the lightpipe to evenly illuminate the graphics.

19 Claims, 5 Drawing Sheets

ILLUMINATED INDICATOR

RELATED APPLICATION

This application claims priority to U.S. provisional patent application Ser. No. 60/516,933 filed on Nov. 3, 2003.

TECHNICAL FIELD

The present invention generally relates to vehicular indicators. In particular, the present invention relates to an illuminated indicator that provides an even lighting pattern with light from a lightpipe.

BACKGROUND OF THE INVENTION

It is known that vehicular indicators are typically located proximate an instrument panel area. As seen in FIGS. 6 and 7, such indicators may include, for example, a gauge assembly, which is seen generally at reference numeral 100. Such conventional gauge assemblies 100 are typically lit using a relatively large number of light sources, one of which is referenced generally at reference numeral 102. Light, L, from the light sources 102 pass through a graphic applique 104 to create an effect or design theme. Appliques 104 typically include layers of multiple ink passes (not shown) that are screened on a polycarbonate substrate, which define the graphics. The ink passes diffuse the light intensity to create a balanced display for viewing by a vehicle operator. As illustrated, the light sources 102 are arranged directly behind the applique 104 so that the resulting light, L, cones-out in a cone-like shape 106 to illuminate the graphics.

Placement of the light sources 102 is important in creating a luminously-balanced display. If the display is not luminously balanced, "hot spots" or shadows may occur due to the location of other interior components (i.e., electrical or structural components) of the design. Specific examples of light sources 102 most often used include incandescent bulbs, light emitting diodes (LEDs), or an electro-luminescent film. Traditionally, incandescent bulbs are used because incandescent bulbs produce a high intensity, very repeatable, wide-cone "white light" (i.e., light which covers a large portion of the visible spectrum). However, when LEDs are implemented, the gauge assembly 100 may require a large quantity of LEDs to create luminously balanced intensities because LEDs typically provide a narrow-cone propagation of light, L, at a higher intensity in comparison to the light output of incandescent bulbs. Such implementations may comparatively require approximately six incandescent lamps or approximately twenty LEDs.

In general, the light, L, from any selected light source 102 may be of a higher than required intensity, and the excess light, L, is typically blocked by using diffusion and compensation ink passes on the applique 104. Thus, extra care must be taken when designing conventional luminously-balanced gauges 100, which are limited to a white daytime appearance and a different, non-white (i.e. green or amber), nighttime appearance.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
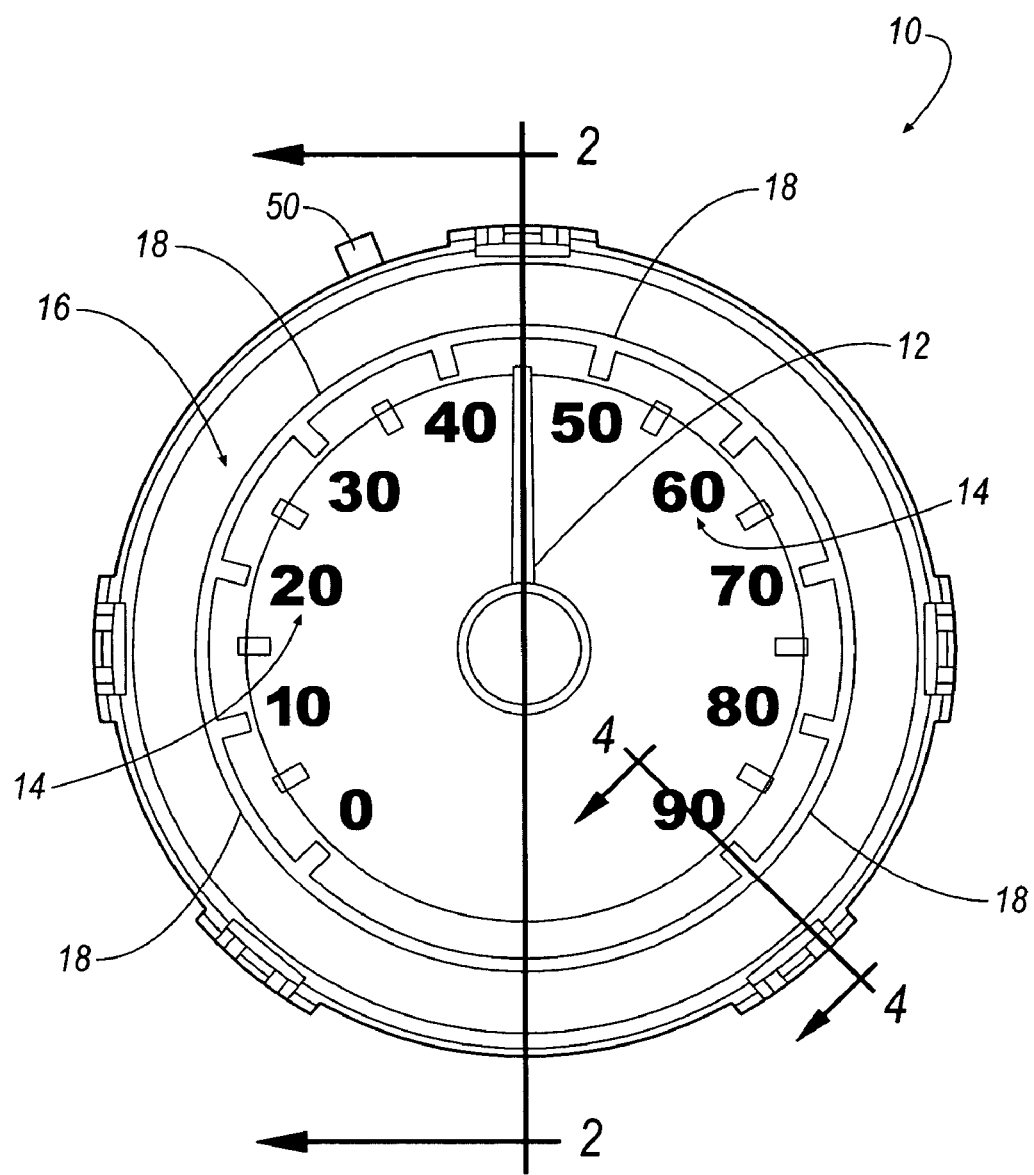
FIG. 1 illustrates an overhead view of a gauge assembly according to an embodiment.
Figure 2:
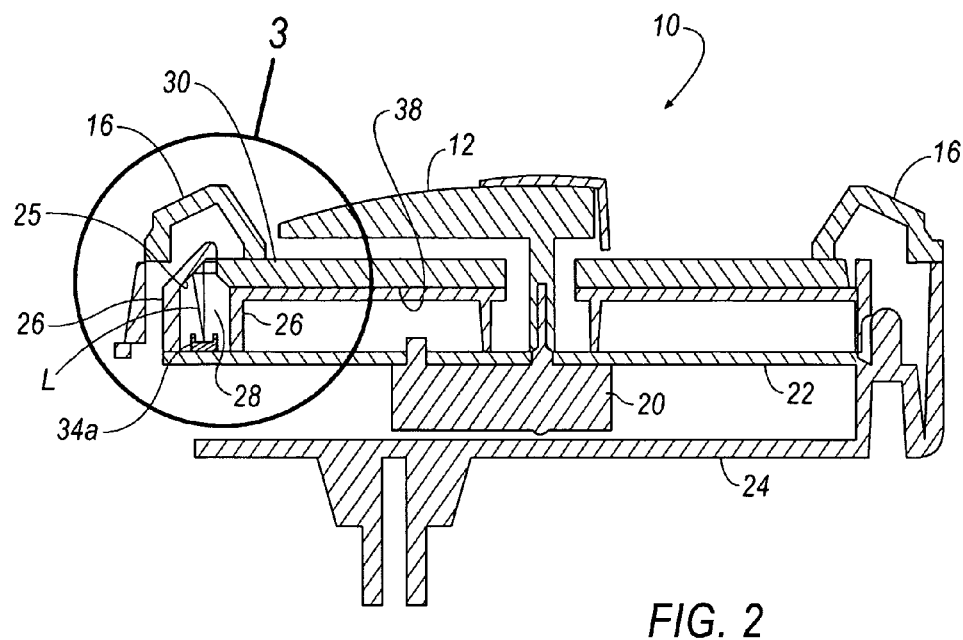
FIG. 2 illustrates a cross-sectional view of the gauge assembly according to line 2-2 of FIG. 1.
Figure 3A:
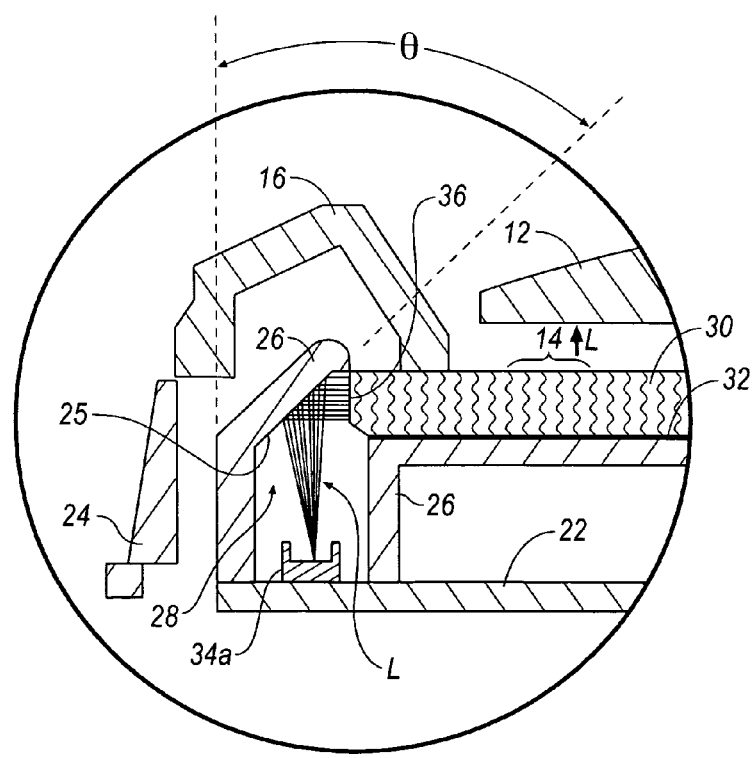
FIG. 3A illustrates a magnified view of FIG. 2 taken from line 3.
Figure 5:
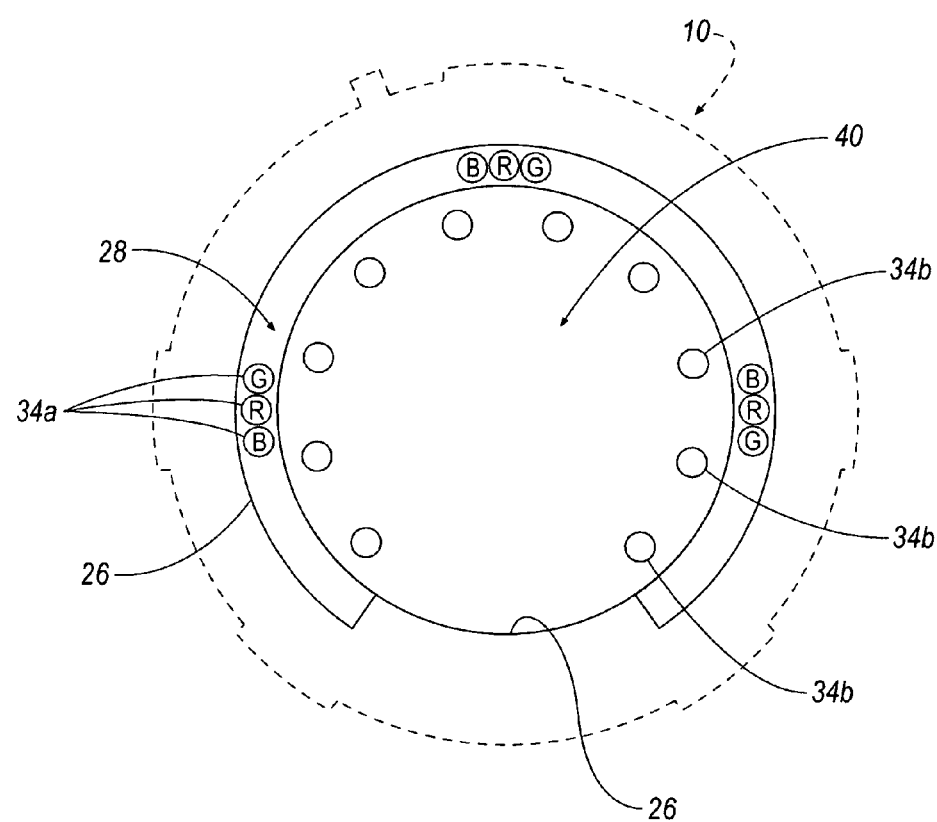
FIG. 5 illustrates an overhead, representative view of first and second banks of light sources arranged in the gauge assembly of FIG. 1 according to an embodiment.
Figure 6:
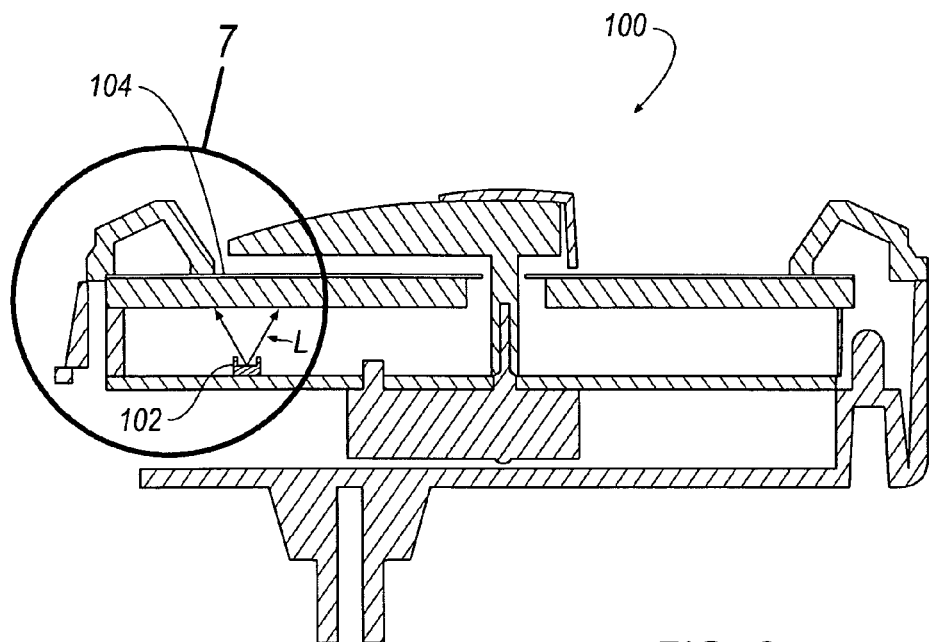
FIG. 6 illustrates a cross-sectional view of a conventional gauge assembly.
Figure 7:
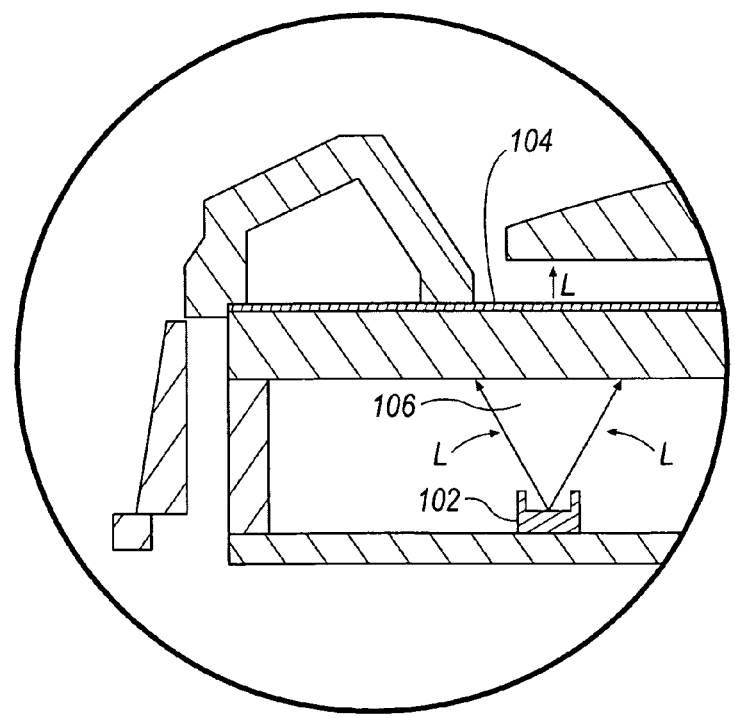
FIG. 7 illustrates a magnified view of FIG. 6 taken from line 7.

Referring to FIG. 1, an illuminated indicator in the form of a gauge assembly is shown generally at 10. From the perspective of a vehicle operator, the gauge 10 includes a pointer 12, illuminatable graphics 14, and a bezel enclosure 16 that generally encompasses a perimeter 18 of the gauge 10. As seen in FIGS. 2 and 3A, the pointer 12 is supported and driven by a motor 20 and circuit board 22, which is closed out by a cover 24. The gauge assembly 10 also includes a housing 26 that defines an outer perimeter light channel 28, a lightpipe 30, a dark background applique 32, and a plurality of light sources, one of which is referenced generally at reference numeral 34a, that are disposed about the outer perimeter light channel 28 (FIG. 5).

According to an embodiment, the light sources 34a are LEDs of different colors. The selected colors may include any desirable combination, such as, for example, red, green, and blue (RGB). However, it will be appreciated that the RGB color combination may include any desirable number of colors or combinations. For example, the LEDs 34a may also include a white, amber, yellow, orange, or a purple color. In operation, when light, L, is emitted from the LEDs 34a, the light, L, is further restricted by the surrounding housing 26, which essentially restricts propagation of and directs the light, L, to an outer perimeter edge 36 of the lightpipe 30.

The housing 26 may comprise any desirable reflective plastic. For example, the housing 26 may comprise a plastic sold under the trade-name NORYL®, which is commercially available from General Electric Company Corporation of New York, N.Y. Although NORYL® is adequate in providing reflective properties, other suitable materials for the housing 26 may include a white polypropylene (PP) or a white acrylonitrile butadiene styrene (ABS). In yet another alternative embodiment, the housing 26 may comprise a black plastic resin with a reflective foil; however, such a sub-assembly may increase cost and labor of the gauge 10.

The lightpipe 30 includes a laser cut geometry that produces a relatively smooth edge surface 36 to provide a total internal reflection (TIR) for any received light, L. To reflect the light, L, into the edge surface 36 of the lightpipe 30, the outer perimeter light channel 28 is shaped to have a reflecting wall 25 positioned at an angle, θ, in the range of approximately 40°-60°, which is dependent upon the incident angle of the lightpipe material. For example, if the lightpipe 30 is made of sheet stock acrylic, the angle, θ, is approximately equal to 47°-53°. However, it will be appreciated that the lightpipe 30 is not limited to sheet stock acrylic and that the lightpipe 30 may include a polycarbonate material. If a polycarbonate material is utilized, then the angle, θ, will vary according to the refractive index of a polycarbonate lightpipe 30. Although the lightpipe 30 is described to include a laser cut geometry, it will be appreciated that the lightpipe 30 may be formed by using any desirable methodology, such as, for example, molding.

Referring to FIG. 2, prior to integration with the gauge assembly 10, the graphics 14 are provided on the rear surface 38 of the lightpipe 30. The graphics 14 may be formed on the rear surface 38 using any desirable methodology including, but not limited to, laser-etching, acid-etching, pad-printing, screen-printing or the like. Upon being formed on the rear surface 38 of the lightpipe 30, the graphics 14 appear to have a white appearance during daytime vehicle operation when the LEDs 34 are not activated because the dark background applique 32 located adjacent the rear surface 38 provides a high degree of contrast against the white graphics 14. Even further, the provision of the graphics 14 on the rear surface 38 of the lightpipe 30 that are contrasted against the dark applique 32 gives the appearance of graphics 14 that float in space against a bottomless background upon activation of the LEDs 34a.

As seen more clearly in FIG. 3A, when the LEDs 34a are activated, the light, L, enters the edge 36 of the lightpipe 30, which results in the light, L, being internally reflected therein until the light, L, is disrupted by the graphics 14. When the graphics 14 disrupted the light, L, even illumination of graphics 14 on the entire gauge 10 is enabled. As such, undesirable "hot spots" and shadowing of the gauge 10 are eliminated.

Figure 3B:
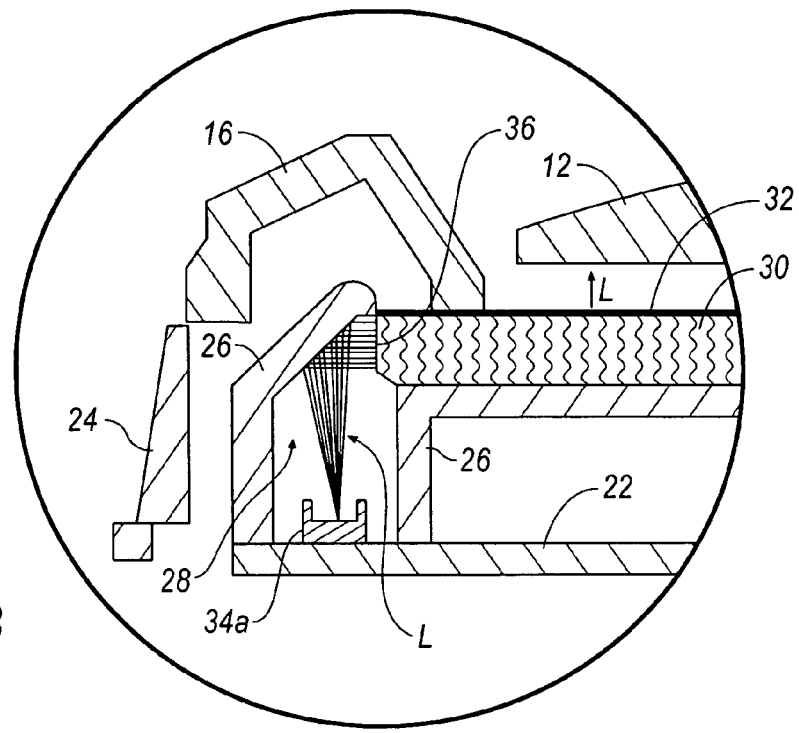
FIG. 3B illustrates a magnified view of FIG. 2 taken from line 3 according to another embodiment.

In an alternative embodiment illustrated in FIG. 3B, the graphics 14 may be provided about the applique 32 in a conventional fashion; and applique 32 is applied to the front surface of lightpipe 30. As such, the light, L, enters the lightpipe 30 as described above and is permitted to exit through the applique 32 on the front surface of lightpipe 30, where the graphics 14 are located.

Figure 4:
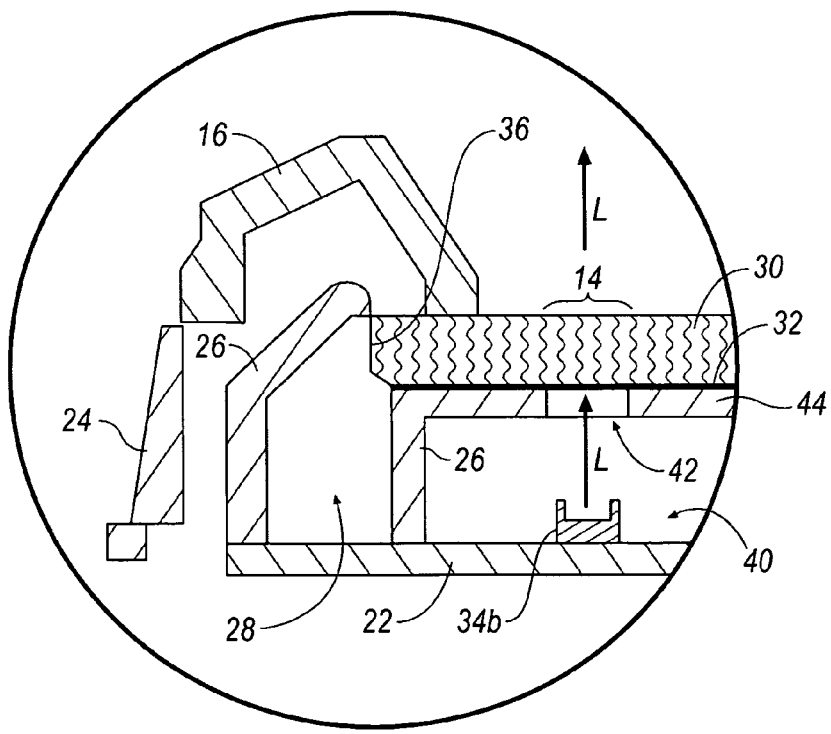
FIG. 4 illustrates a magnified cross-sectional view of the gauge assembly according to line 4-4 of FIG. 1.

Referring to FIG. 4, a second bank of LEDs, one of which is referenced generally at reference numeral 34b, may be included in the gauge assembly 10. The LEDs 34b may be located substantially behind the location of the graphics 14 in an inner light channel 40 defined by the housing 26. As illustrated, light, L, from the LEDs 34b may pass through an opening 42 formed in a support surface 44 of the housing 26 that is adjacent the applique 32 or lightpipe 30 (i.e. depending on the embodiment as shown FIG. 3A or 3B). Although the view in FIG. 4 illustrates one opening 42 co-located over one LED 34b, it will be appreciated that the housing 26 may include a plurality of openings 42 arranged in a horse-shoe like configuration (FIG. 5) that are co-located over individual second bank LEDs 34b.

Regardless of the implementation illustrated in FIG. 3A or 3B, when one or more of the LEDs 34b is/are activated, the associated graphic 14 that is/are proximate the LED(s) 34b will be illuminated with a higher intensity to give the vehicle operator a message or indication. If desired, the illumination of a higher intensity from the LEDs 34b may be of a different color than the even illumination provided by the first bank of LEDs 34a. For example, red LEDs 34b may be provided behind the '70', '80', and '90' graphics 14. Accordingly, when the vehicle is accelerated to a higher speed in the 70-90 graphic range, logic from a microprocessor (not shown) may cause the red LEDs 34b behind the '70', '80', and '90' graphics 14 to illuminate in red, higher intensity light while the rest of the gauge 10 is evenly illuminated by LEDs 34a that are tuned to a lower intensity green color, for example. As such, an even illumination of the graphics 14 labeled in the range of 0-60 is maintained while the graphics labeled in the range of 70-90 is intensified in a different color to visually warn the vehicle operator that the vehicle is being operated at a relatively higher speed. However, it will be appreciated that although the above-described example provide red LEDs 34b, the invention is not limited to different-colored LEDs, and if desired, the LEDs 34b may be of the same color and may simply provide a greater, direct-from-behind illumination over the LEDs 34a to provide the vehicle operator with a message as described above.

As such, in an alternative implementation, if an arrangement of one or more LED(s) 34b is provided behind a left-hand turn arrow graphic (not shown), the left-hand arrow graphic may be evenly illuminated by the first bank of LEDs 34a, and then, when the vehicle operator activates a left-hand turn device (not shown), the one or more LED(s) 34b may be activated to provide a direct, rear illumination of the left-hand turn arrow graphic 14. Accordingly, the left-hand turn arrow is illuminated with a higher intensity while the remaining graphics 14 on the instrument panel and/or gauge 10 (e.g., the right-hand turn arrow) is evenly illuminated by the first bank of LEDs 34a of a lower intensity.

As seen in FIG. 5, the first bank of LEDs 34a are located within the outer perimeter light channel 28, and the second bank of LEDs 34b are located within the inner light channel 40. As illustrated, the second bank of LEDs 34b are substantially located in the vicinity of where the graphics 14 are located in FIG. 1, and the first bank of LEDs 34a are disposed in a horse-shoe-like configuration, proximate the location of the graphics 14. It will be appreciated that the first bank of LEDs 34a are not limited to an arcuate, circular, or horse-show-like configuration and that the first bank of LEDs 34a may be arranged in any desirable configuration that permits an outer perimeter lighting of the lightpipe 30. For example, if the gauge 10 were arranged in a square configuration, the first banks of LEDs 34a may be arranged within the outer perimeter light channel of a square-like configuration.

As illustrated, nine LEDs 34a are included in the outer perimeter light channel 28. However, it will be appreciated that the gauge 10 may include any desirable number of LEDs 34a, such as, for example, an amount ranging from three to twelve LEDs 34a. When implementing the RGB color combination, it is preferable to locate the red LED (R) between the blue LED (B) and the green LED (G) to provide an even color mixing since red is typically mixed with either (or both) the blue and green colors to achieve a multi-color illumination. As illustrated, three individual clusters of RGB LEDs 34a are implemented and evenly spaced in the outer perimeter light channel 28. However, it will be appreciated that other implementations may be implemented such that the LEDs 34a may be unevenly spaced in any desirable configuration.

Multiple colors of the gauge 10 may be provided by controlling the individual on/off time of each LED 34a. For example, the on/off control of the LEDs 34a may be driven by using a pulse width modulation (PWM) control technique. To change the gauge color (and on/off time of the LEDs 34a) an input means, such as a depressable button 50 (FIG. 1) is manually controlled by the vehicle operator. Accordingly, the vehicle operator may press the button 50 to initiate the PWM control technique so that the vehicle operator may scroll through any desirable number of preset colors, such as, for example, red, green, blue, white, amber, or purple.

According to another embodiment, the vehicle operator may press and hold the button 50 to tune the color of the gauge 10. If an RGB color combination is implemented for the LEDs 34*a*, it may be possible to achieve one-hundred-and-twenty-five different colors for the gauge 10. If desired, the input means 50 may include other input devices, such as a thumb-wheel and high/low switch to scroll between and/or tune the selectable colors of the gauge 10. Although the button 50 is illustrated proximate the gauge 10, it will be appreciated that the button 50 may be remotely located from the gauge 10, such as, for example, proximate a cluster dimmer/headlamp bezel, a center console (not shown), or the like.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An illuminated indicator, comprising:
   a lightpipe having a front surface, a rear surface and an outer edge peripheral surface;
   graphics disposed on the rear surface of the lightpipe;
   a housing that supports the rear surface of the lightpipe, wherein the housing defines an outer perimeter light channel peripherally and outwardly adjacent the outer edge peripheral surface of the lightpipe; and
   a plurality of light sources that are disposed about the outer perimeter light channel, wherein the outer perimeter light channel facilitates mixing of light from the plurality of light sources and directs the mixed light from the plurality of light sources to the outer edge peripheral surface of the lightpipe for entry into the lightpipe therethrough, wherein the graphics redirect a portion of the light in the lightpipe passing across and interacting therewith for escape from the lightpipe through the front surface to render the graphics visible to a viewer facing the front surface thereof.

2. The illuminated indicator of claim 1, wherein the plurality of light sources are differently colored.

3. The illuminated indicator of claim 2, wherein the plurality of differently colored light sources include
   at least one red light source,
   at least one blue light source, and
   at least one green light source.

4. The illuminated indicator of claim 2, wherein the plurality of light sources are light emitting diodes (LEDs).

5. The illuminated indicator of claim 1, wherein the outer perimeter light channel includes a reflecting wall that directs the light to the outer edge perimeter of the lightpipe, wherein the reflecting wall is located opposite the outer perimeter edge of the lightpipe and above the plurality of light sources at an angle.

6. The illuminated indicator of claim 5, wherein the angle ranges from approximately 40°-60°.

7. The illuminated indicator of claim 6, wherein the lightpipe includes a sheet stock acrylic material, wherein the angle is ranges from approximately 47°-53°.

8. The illuminated indicator of claim 1 further comprising a dark background applique intermediately located between a support surface of the housing and the rear surface of the lightpipe to provide a contrasting dark color against the graphics, wherein the graphics include a relatively light color compared to the dark applique.

9. An illuminated indicator, comprising:
   graphics disposed on a rear surface of a lightpipe;
   a housing that supports the rear surface of the lightpipe, wherein the housing defines an outer perimeter light channel;
   a plurality of light sources that are disposed about the outer perimeter light channel, wherein the outer perimeter light channel facilitates directs light from the plurality of light sources to an outer perimeter edge of the lightpipe to evenly illuminate the graphics;
   a dark background appligue intermediately located between a support surface of the housing and the rear surface of the lightpipe to provide a contrasting dark color against the graphics, wherein the graphics include a relatively light color compared to the dark appligue; and
   a second plurality of light sources disposed about an inner light channel defined by the housing, wherein at least one individual light source of the second plurality of light sources is located substantially behind the graphics, wherein light from the at least one individual light source of the second plurality of light sources passes through an opening formed in a support surface of the housing to provide an illumination of a higher intensity over the even illumination provided by the first plurality of light sources.

10. The illuminated indicator of claim 9, wherein the illumination of a higher intensity is of a different color than the even illumination.

11. The illuminated indicator of claim 1, wherein individual on/off time of each of the plurality of light sources that are disposed about the outer perimeter light channel are controlled by a manual input means.

12. The illuminated indicator of claim 11, wherein the manual input means is a button that, upon being depressed, provides a selection of one of a plurality of pre-set even illumination colors and/or a variable even illumination color.

13. The illuminated indicator of claim 12, wherein the plurality of pre-set even illumination colors includes red, green, blue, white, amber, and purple.

14. The illuminated indicator of claim 1, wherein the graphics are disposed on the rear surface of lightpipe via a laser-etching process, an acid-etching process, or a pad-printing process.

15. A method of illuminating an indicator, comprising:
   providing graphics on a rear surface of a lightpipe having a front surface, a rear surface and an outer edge peripheral surface;
   disposing a plurality of light sources about an outer perimeter light channel of a housing that supports the lightpipe and is located peripherally and outwardly adjacent the outer edge peripheral surface of the lightpipe, and
   mixing light from the plurality of light sources within the outer perimeter light channel; and
   directing the mixed light from the plurality of light sources to the outer edge peripheral surface of the lightpipe for entry into the lightpipe therethrough, wherein the graphics redirect a portion of the light in the lightpipe passing across and interacting therewith for escape from the lightpipe through the front surface to render the graphics visible to a viewer facing the front surface thereof.

16. A method of illuminating an indicator, comprising:
  providing graphics on a rear surface of a lightpipe;
  disposing a plurality of light sources about an outer perimeter light channel of a housing that supports the lightpipe;
  directing light from the plurality of light sources through the outer perimeter light channel to an outer perimeter edge of the lightpipe to evenly illuminate the graphics;
  disposing a second plurality of light sources about an inner light channel defined by the housing, wherein individual light sources of the second plurality of light sources are positioned substantially behind the graphics; and
  directing light through the housing to illuminate the graphics with a light of a higher intensity than that of the plurality of light sources disposed about the outer perimeter light channel.

17. The method of illuminating an indicator according to claim 15 further comprising the step of
  changing the color of the light provided by the plurality of light sources disposed about the outer perimeter light channel by providing a manual input means that controls the on/off time of the plurality of light sources.

18. The method according to claim 17, wherein, upon providing an input to the manual input means, allowing an operator to select one of a plurality of preset colors.

19. The method according to claim 17, wherein, upon providing an input to the manual input means, allowing an operator to tune the color of the light provided by the plurality of light sources disposed about the outer perimeter light channel.

* * * * *